A. ABBEY & G. BRAMMAR.
Revolving Horse-Rake.
No. 211,680. Patented Jan. 28, 1879.
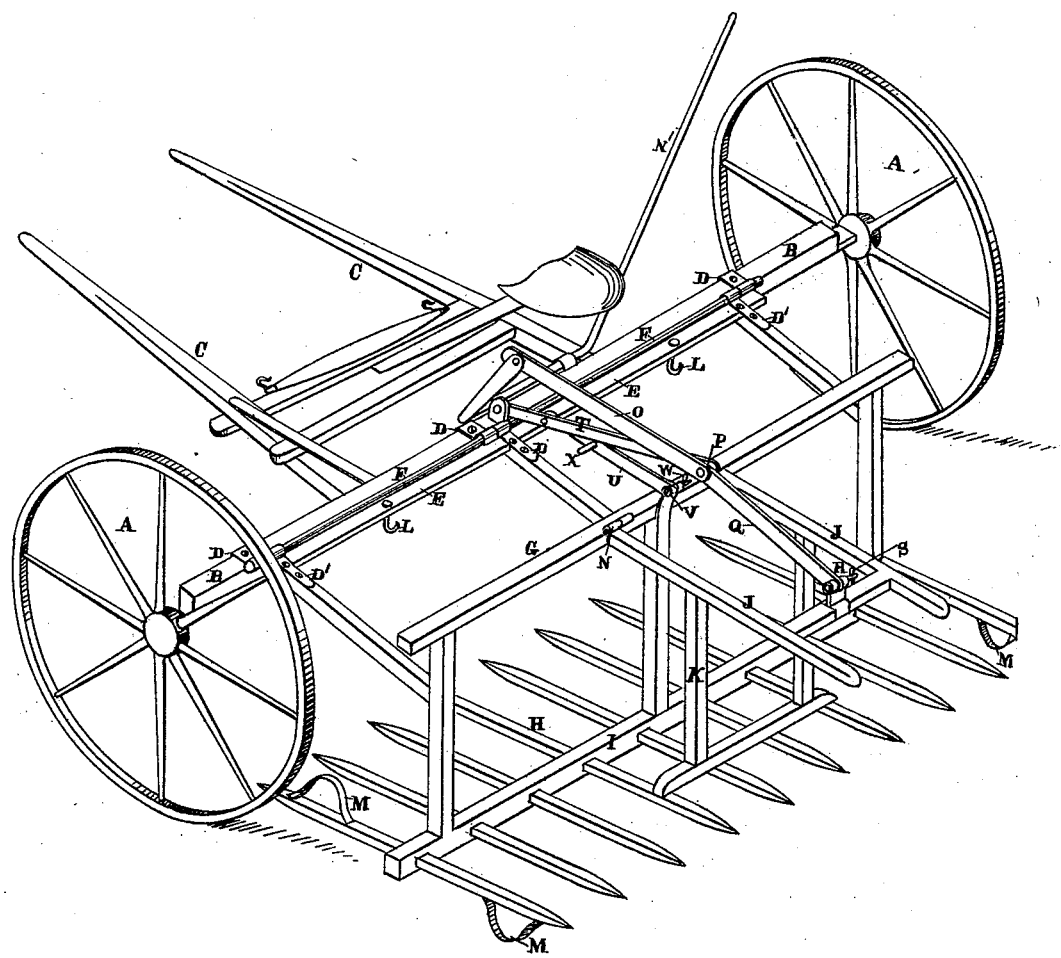
Witnesses
Geo. H. Strong
Frank A. Brooks
Inventor
Alonzo Abbey
Geo. Brammar
By Dewey & Co.
attys

UNITED STATES PATENT OFFICE.

ALONZO ABBEY AND GEORGE BRAMMAR, OF LIVERMORE, CALIFORNIA.

IMPROVEMENT IN REVOLVING HORSE-RAKES.

Specification forming part of Letters Patent No. 211,680, dated January 28, 1879; application filed September 16, 1878.

*To all whom it may concern:*

Be it known that we, ALONZO ABBEY and GEORGE BRAMMAR, of Livermore, county of Alameda, and State of California, have invented a Combined Sulky and Single Walking Revolving Rake; and we do hereby declare the following to be a full, clear, and exact description thereof, reference being had to the accompanying drawing.

Our invention relates to an improved combined wooden-tooth sulky and single walking revolving rake; and our improvements consist in so attaching an ordinary single walking revolving rake to a sulky that its operation may be controlled by the driver from his seat without any one being compelled to walk behind to attend the handles regulating the detaining-block, which controls the teeth of the rake.

It also consists in forming the connections between the sulky and walking-rake so that they may be separated and the walking-rake used in the ordinary manner for rough or hilly land.

Referring to the accompanying drawing for a more complete explanation of our invention, the figure represents a perspective view of our invention.

Let A represent the wheels, B the axle, and C the shafts, of a sulky-rake, the seat provided for the driver being secured forward of the axle, as shown.

On top of the axle B are secured strap-hinges D, and on top of the front cross-bar E of the rake-frame are corresponding strap-hinges D', both sets so arranged with relation to each other that a connecting-rod, F, will pass through the hasps of the hinges and join the head of rake and axle of sulky together.

The revolving rake is formed of the cross-bar E, frame G, teeth H, mounted on the revolving bar or head I, and handles J, to which is attached the detaining-block K.

When used as a walking-rake for rough or hilly land, the connecting-rod F is slid back, so as to separate the strap-hinges, and the levers, hereinafter described, are disconnected, which allows the frame of the rake to be taken from the axle. The horse is then hitched to the hooks or lugs L on the lower part of the cross-bar E.

The wooden teeth of the rake rest on the ground, and are held on an incline forward by the curved shoes M on the rear lower side of the teeth. The driver holds the handles in his hand, and by exerting a slight pressure downward keeps the rake-teeth in position by keeping the detaining-block K on the rear ends of the rake-teeth.

After the rake-teeth have collected their load on their forward ends, by lifting up the handles, which are hinged, as shown at N, to the rake-frame, the detaining-block K is lifted from the rear ends of the rake-teeth, and, as the forward ends can then catch in the ground, the rake-teeth turn over and dump the load. This is rendered possible by the head I being journaled to the standards of the rake-frame; so as to admit of its revolving. As the rake turns over the shoes M on the lower rear end of the teeth come on top on front, and other shoes on the opposite ends of the teeth come into position in the rear, to perform the same service and be in turn reversed.

Now, when it is desired to use the revolving rake as a sulky-rake, the cross-bar of the rake-frame is secured to the axle of the sulky by the connecting-rod I; but, in order to allow the driver on the seat of the sulky to operate the rake, a system of levers connecting with the handles is necessary.

On the axle B, beside the driver's seat, is the crank-lever N', having the long arm extending up beside the seat, so as to be grasped by the driver. To the other end of this crank-lever is pivoted the bar O, which extends back, and is pivoted or hinged at P to the handle-lifting bar Q, as shown. This handle-lifting bar is hinged to the handles J by means of a pin, R, through one end of which passes the key S, so that when the key is removed the pin may be withdrawn and the bar disconnected from the handle, for the purpose hereinafter described. The same pin P which connects the bars O and Q passes through these and through the end of a bar, T, the forward end of said bar T being pivoted or hinged to the axle, as shown. A short distance from the forward end of this bar T is pivoted or hinged another bar, U, which extends back to the top rear bar of the rake-frame, and is there held in place by a pin, V, passing through it and through lugs, as shown. A key, W, secures this pin, so that by removing the key the pin may be taken out and the bar U disconnected from the rake-frame, for the purpose hereinafter described.

It will be seen that by the use of this system of levers the driver on his seat has the same control over the rake-teeth as if he were walking behind them and held the handles. By a slight backward pressure on the long arm of the lever N', which forms the handle for the driver, the detaining-block K is held down on the rear ends of the teeth by the short arm of the lever N' pushing back on the bar O, which is hinged to the bar Q, which, in turn, is hinged to the handles J, on which the detaining-block is secured. Usually the weight of handles and detaining-block are sufficient to keep the rake from revolving.

When it is desired to dump the load by allowing the rake to revolve, the driver throws the long arm or handle of the lever N' forward. This action draws the short arm of the lever N' also forward, which, by its hinged connections with the rear end of the handles J, lifts the rear end of said handles, and with them the detaining-block, allowing the teeth to revolve and dump the load.

The same action of drawing the levers N' and the bars O and Q forward lifts the rear end of the bar T up, said bar being hinged at its rear end to the bar O at P. As this bar T is lifted up and its rear end drawn forward, the bar U, which is hinged to the bar T, is also moved forward and upward. As the rear end of the bar U is hinged to the upper part of the rake-frame, when the lever N' is thrown forward by the connection described leverage is applied to the rake-frame so as to lift it upward and admit of the teeth revolving readily. This action of the levers U and T is, from their peculiar connection, somewhat slower than that of the bars moving the rake-handles, so that as the rake begins to revolve and the driver draws his lever forward the action of lifting the rake-frame to assist the rake in turning comes just at the proper moment.

A lug, X, on the bar U is so placed that the bar T strikes on it when down, and thus prevents the lever N' from coming too far back and the detaining-block from pressing the rear end of the teeth too far down to allow of the necessary forward inclination of said teeth.

Now, in order to disconnect the walking-rake from the sulky, so as to use the walking-rake alone, the connecting rod or pin F is slipped out, so that the hinges on the cross-bar and axle may be separated. Then the key in the pin R, joining the bar Q to the handles, is removed and the pin taken out, thus disconnecting this bar Q from the handles of the rake. The pin V may be removed by taking out the key W, which disconnects the bar W from the rake-frame.

The revolving rake may then be separated from the sulky, the levers and bars remaining on the sulky, when the rake may be used as an ordinary walking revolving rake.

By this means we provide a combined sulky and single walking-rake, which may be used as such, or the walking-rake detached for use, as desired.

The connections are simple in construction and operation, and the whole device strong and practical. It admits of the use of wooden revolving teeth, while at the same time a sulky can be used and the driver may ride.

The usual form of teeth in use for sulky-rakes are curved metallic ones, which collect considerable dirt in the grain or hay. The revolving hand-rakes with wooden teeth are usually preferred, but with their use the driver has to walk. In our device the useful features of both rakes are combined, while the combination may be broken if desired, and the walking-rake used as such on hilly or rough land.

Having thus described our invention, what we claim, and desire to secure by Letters Patent, is—

1. The rake-frame E, hinged to the sulky-axle at D, and supporting the revolving rake in standards, as shown, and provided with the lever N', connecting-rods O, Q, and T, in combination with the supplemental connecting-rod U, whereby the rake-frame itself is raised and the rake is assisted to tilt, substantially as herein described.

2. The combination, with the rake-frame and holding-foot, of the operating-lever N', with its connecting-rods O, Q, T, and U, the last provided with the stop x, all operating respectively as shown, substantially as and for the purpose herein described.

In witness whereof we have hereunto set our hands.

ALONZO ABBEY.
GEORGE BRAMMAR.

Witnesses:
  R. W. GRAHAM,
  C. B. ACKER.